United States Patent
Liberman et al.

(10) Patent No.: US 10,851,901 B2
(45) Date of Patent: Dec. 1, 2020

(54) STREAM SWITCHING VALVE WITH SYNCHRONIZING MECHANISM

(71) Applicant: HAM-LET (ISRAEL-CANADA) LTD., Nazareth (IL)

(72) Inventors: Tuvia Liberman, Yodfat (IL); Felix Shestatski, Karmiel (IL); Alaa Rabah, Arrabah (IL); Boris Margol, Neve Ziv (IL); Sergey Seryogin, Migdal Haemek (IL)

(73) Assignee: HAM-LET (ISRAEL—CANADA) LTD., Nazareth (IL)

( * ) Notice: Subject to any disclaimer, the term of this patent is extended or adjusted under 35 U.S.C. 154(b) by 216 days.

(21) Appl. No.: 16/070,847

(22) PCT Filed: Jan. 17, 2017

(86) PCT No.: PCT/IL2017/050054
§ 371 (c)(1),
(2) Date: Jul. 18, 2018

(87) PCT Pub. No.: WO2017/125914
PCT Pub. Date: Jul. 27, 2017

(65) Prior Publication Data
US 2019/0063625 A1    Feb. 28, 2019

Related U.S. Application Data

(60) Provisional application No. 62/279,842, filed on Jan. 18, 2016.

(51) Int. Cl.
*F16K 11/22*     (2006.01)
*F16K 31/53*     (2006.01)
(Continued)

(52) U.S. Cl.
CPC ........ *F16K 11/22* (2013.01); *F16K 11/0873* (2013.01); *F16K 11/165* (2013.01);
(Continued)

(58) Field of Classification Search
CPC .... F16K 11/22; F16K 11/0873; F16K 11/165; F16K 27/003; F16K 27/06; F16K 31/535; F16K 35/14; Y10T 137/87249
See application file for complete search history.

(56) References Cited

U.S. PATENT DOCUMENTS 1,107,635 A * 8/1914 Wagner ............... F01P 11/20
                                                    123/41.14
2,399,460 A * 4/1946 Britton ................ F16K 11/22
                                                    137/555
(Continued)

FOREIGN PATENT DOCUMENTS

DE              4324867 A1 * 1/1995    ......... F16K 11/0873
DE    202005009176 U1 * 7/2006      ........... F16K 27/067
(Continued)

*Primary Examiner* — Jessica Cahill
(74) *Attorney, Agent, or Firm* — The Roy Gross Law Firm, LLC; Roy Gross

(57) ABSTRACT

A stream switching valve for alternatively feeding two fluids to an object of interest comprises a housing having first, second and third cavities, first, second and third ball members sealably placeable into said first, second and third cavities, first and second inlet passages being in fluid communication with said first and second cavities, an outlet passage being in fluid communication with said third cavity; said outlet passage connectable to an object of interest; first and second intermediate passages fluidly connecting said first and second cavities to said third cavity, first, second and third vent passages fluidly connecting said into first, second and third cavities to environment. The first and second ball members are configured to connect said first and second intermediate passages to first and second inlet passages and (Continued)

first and second vent passages, respectively, in turn. The third ball member is rotatable and configured to connect said outlet passage to said first intermediate passage, said second intermediate passage and said third vent passage, in turn.

12 Claims, 4 Drawing Sheets

(51) Int. Cl.
| | |
|---|---|
| *F16K 11/087* | (2006.01) |
| *F16K 27/06* | (2006.01) |
| *F16K 27/00* | (2006.01) |
| *F16K 11/16* | (2006.01) |
| *F16K 35/14* | (2006.01) |

(52) U.S. Cl.
CPC ............ *F16K 27/003* (2013.01); *F16K 27/06* (2013.01); *F16K 31/535* (2013.01); *F16K 35/14* (2013.01)

(56) References Cited

U.S. PATENT DOCUMENTS

| | | | |
|---|---|---|---|
| 3,834,372 A | | 9/1974 | Turney |
| 4,196,752 A | * | 4/1980 | Niskanen ................ F16K 11/16 137/240 |
| 4,960,127 A | * | 10/1990 | Noce .................... A61B 5/0215 600/488 |
| 6,668,860 B1 | | 12/2003 | Alexander et al. |
| 9,004,106 B2 | * | 4/2015 | Schlichter ............. B01D 35/12 137/637 |
| 9,222,597 B2 | * | 12/2015 | Asokan ................ F16K 11/14 |
| 2005/0072481 A1 | * | 4/2005 | Hanada ................ F16K 27/003 137/884 |
| 2009/0050830 A1 | | 2/2009 | Albert et al. |
| 2013/0061968 A1 | | 3/2013 | Schlichter et al. |

FOREIGN PATENT DOCUMENTS

| | | | |
|---|---|---|---|
| FR | 2926126 B1 | * 7/2016 | .......... F16K 31/535 |
| GB | 2236829 | 4/1991 | |

* cited by examiner

STREAM SWITCHING VALVE WITH SYNCHRONIZING MECHANISM

RELATED APPLICATIONS

This application is a National Phase of PCT Patent Application No. PCT/IL2017/050054 having International filing date of Jan. 17, 2017, which claims the benefit of priority of U.S. Provisional Application No. 62/279,842 filed on Jan. 18, 2016. The contents of the above applications are all incorporated by reference as if fully set forth herein in their entirety.

FIELD OF THE INVENTION

The present invention relates to a stream switching valve, and, more specifically, to a stream switching valve for alternatively feeding two fluids to an object of interest.

BACKGROUND OF THE INVENTION

It is often very important to know what fluids are flowing through a conduit such as a pipeline. For example, a buyer and seller of gas may agree upon a price for the fluid flowing through a process pipeline based upon the content of the fluid stream. Thus, the fluid content must be measured. Where multiple pipelines are positioned near one another, it may be economical to use a single meter or measurement device to monitor all of the fluid flows. The device used to extract and deliver the fluid to the measurement device is traditionally referred to as a sampling system.

U.S. Pat. No. 6,363,966 discloses a double block and double bleed stream switching system including a common stream path for a multitude of fluid streams from, for example, a process pipeline. The common stream path includes a blocking port and a bleed port, and connects to at least one sample shut off. Preferably, the common stream path and sample shut off are shallow channels machined in a multi-layered block, with integrated pistons and ports controlling the flow from each stream and through the stream switching system.

The known technical solutions constitute complicated electromechanical devices containing of multitudes of fallible components. A chance of the fault can be decreased by developing a completely mechanical valve device. Thus, there is a long-felt and unmet need for providing a mechanical stream switching valve preprogrammed for alternatively feeding two fluids to an object of interest in a predetermined sequence. The feeding sequence is defined by the mechanical drive and protected from a spurious action.

SUMMARY OF THE INVENTION

It is hence one object of the invention to disclose a stream switching valve for alternatively feeding two fluids to an object of interest. The aforesaid stream switching valve comprises: (a) a housing having first, second and third cavities; (b) first, second and third ball members sealably placeable into said first, second and third cavities, respectively, in a rotatable manner; said first, second and third ball members having said first, second and third stem members, respectively; (c) first and second inlet passages being in fluid communication with said first and second cavities, respectively; said first and second inlet passages connectable to first and second fluid sources, respectively; (d) an outlet passage being in fluid communication with said third cavity; said outlet passage connectable to a fluid object of interest; (e) first and second intermediate passages fluidly connecting said first and second cavities to said third cavity, respectively; (f) first, second and third vent passages fluidly connecting said into first, second and third cavities to environment.

It is a core purpose of the invention to provide the first and second ball members configured to connect said first and second intermediate passages to first and second inlet passages and first and second vent passages, respectively, in turn. The third ball member being rotatable is configured to connect said outlet passage to said first intermediate passage, said second intermediate passage and said third vent passage in turn.

Another object of the invention is to disclose rotation of said first, second and third stem members which is kinematically synchronized by first, second and third cogwheels pivoted to said first, second and third stem members, respectively, thereat said first and second cogwheels are coupled with said third cogwheel.

A further object of the invention is to disclose said first, second and third cogwheels configured for synchronized rotation of said first, second and third ball members; said first, second and third ball members have three successive positions: (a) said first ball member interconnects said first inlet passage and said first intermediate passage; said second ball member interconnects said second intermediate passage and said second vent passage; said third ball member interconnects said first intermediate passage and said outlet passage; (b) said third ball member interconnects said outlet passage and said third vent passage; and (c) said second ball member interconnects said second inlet passage and said second intermediate passage; said first ball member interconnects said first intermediate passage and said first vent passage; said third ball member interconnects said second intermediate passage and said outlet.

A further object of the invention is to disclose the first, second and third cogwheels rotatable by one actuator.

A further object of the invention is to disclose the actuator selected from the group consisting of an electric actuator, a pneumatic actuator, a manual actuator, a magnetic actuator and any combination thereof.

A further object of the invention is to disclose said housing having a longitudinal axis and said first, third and second cavities are successively distributed along said axis.

A further object of the invention is to disclose said first and second inlet passages which are parallel to said axis; said outlet passage, first, second and third vent passages are perpendicular to said axis.

A further object of the invention is to disclose each of said first and second ball members having a diametrical passage and a radial passage fluidly connected to said diametrical passage.

A further object of the invention is to disclose said third ball member having a diametrical passage and two radial passages orthogonal to each other and symmetrically oriented relative to said diametrical passage.

A further object of the invention is to disclose at least one of said two fluids selected from the group consisting of a fluid to be analyzed and a calibration fluid.

A further object of the invention is to disclose method of alternatively feeding two fluids to an object of interest. The aforesaid method comprises the steps of: (a) providing a stream switching valve comprising: (i) a housing having first, second and third cavities; (ii) first, second and third ball members sealably placeable into said first, second and third cavities, respectively, in a rotatable manner; said first, second and third ball members having said first, second and third stem members, respectively; (iii) first and second inlet passages being in fluid communication with said first and second cavities, respectively; said first and second inlet passages connectable to first and second fluid sources, respectively; (iv) an outlet passage being in fluid communication with said third cavity; said outlet passage connectable to a fluid object of interest; (v) first and second intermediate passages fluidly connecting said first and second cavities to said third cavity, respectively; (vi) first, second and third vent passages fluidly connecting said into first, second and third cavities to environment; (vii) said first and second ball members are configured to connect said first and second intermediate passages to first and second inlet passages and first and second vent passages, respectively, in turn; (viii) said third ball member being rotatable is configured to connect said outlet passage to said first intermediate passage, said second intermediate passage and said third vent passage in turn; (b) providing first and second fluids from said first and second sources to said first and second inlets, respectively; (c) providing a first fluid to said outlet passage and emptying said second intermediate passage by positioning said first ball member for interconnecting said first inlet passage and said first intermediate passage, said second ball member for interconnecting said second intermediate passage and said second vent passage and said third ball member for interconnecting said first intermediate passage and said outlet passage; (d) emptying said outlet passage by positioning said third ball member for interconnecting said outlet passage and said third vent passage; and (e) providing a second fluid to said outlet passage and emptying said first intermediate passage by positioning said second ball member for interconnecting said second inlet passage and said second intermediate passage, said first ball member for interconnecting said first intermediate passage and said first vent passage and said third ball member for interconnecting said second intermediate passage and said outlet.

A further object of the invention is to disclose said steps c, d and e of successively positioning said first, second and third stem members which are kinematically synchronized by first, second and third cogwheels pivoted to said first, second and third stem members, respectively, thereat said first and second cogwheels are coupled with said third cogwheel.

BRIEF DESCRIPTION OF THE DRAWINGS

In order to understand the invention and to see how it may be implemented in practice, a plurality of embodiments is adapted to now be described, by way of non-limiting example only, with reference to the accompanying drawings, in which.

DETAILED DESCRIPTION OF THE INVENTION

The following description is provided, so as to enable any person skilled in the art to make use of said invention and sets forth the best modes contemplated by the inventor of carrying out this invention. Various modifications, however, are adapted to remain apparent to those skilled in the art, since the generic principles of the present invention have been defined specifically to provide a stream switching valve and a method of alternatively feeding two fluids to an object of interest using the same.

It should be emphasized that the valve of the present invention can be used for discretely sampling one fluid and feeding it to an object of interest and empting the internal space of the valve after each operation cycle.

The term "ball member" hereinafter refers to any valve plug having at least one internal passage and rotatable within a cavity.

Figure 1:
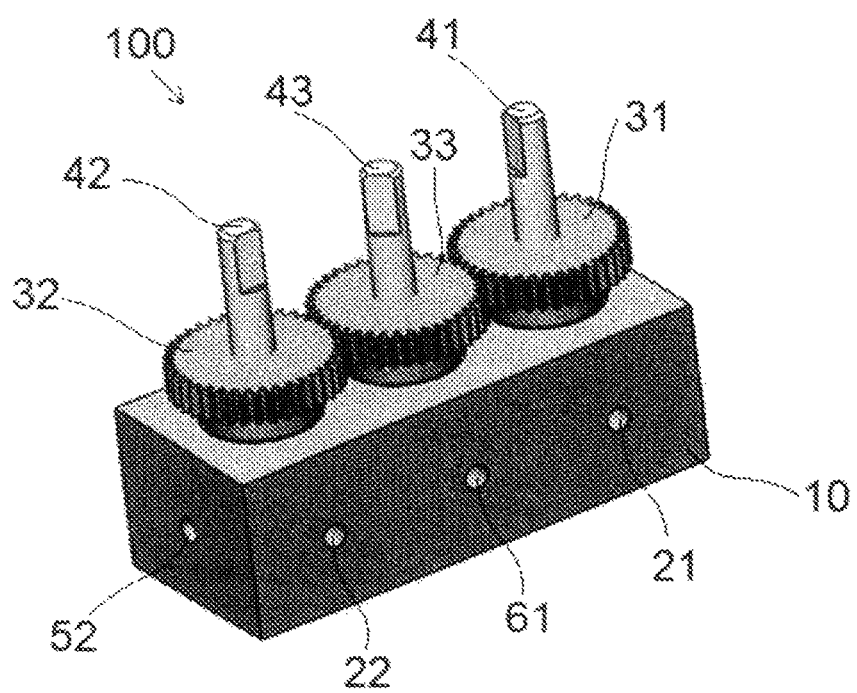
FIG. 1 is an isometric external view of a stream switching valve.

Reference is now made to FIG. 1 showing an isometric external view of an exemplar stream switching valve 100. The aforesaid valve comprises housing 10 having three cavities accommodating first, second and third ball members (not shown). First stem member 41, second stem member 42 and third stem member 43 provided with cogwheels 31, 32 and 33, respectively, are mechanically connected to the corresponding ball members. Stem members 41, 42, 43 are rotatable by cogwheels 31, 32 and 33 driven by a single actuator (not shown), for example, an electric actuator, a pneumatic actuator, a manual actuator, a magnetic actuator and their combination. Functionality of passages 21, 22, 52 and 61 will be specified below.

Other kinds of kinematic linkage such as cam mechanisms between stem members 41, 42, 43 are also in the scope of the present invention. Rigid cogwheel coupling between stem members 41, 42, 43 provides unalterable order of feeding fluids which can be considered as a measure of "idiot proof" increasing reliability of the device of the present invention.

It should be appreciated that the presented linear arrangement of first, second and third ball members is only exemplar. Other ball member arrangements are also in the scope of the present invention.

Figure 2A:
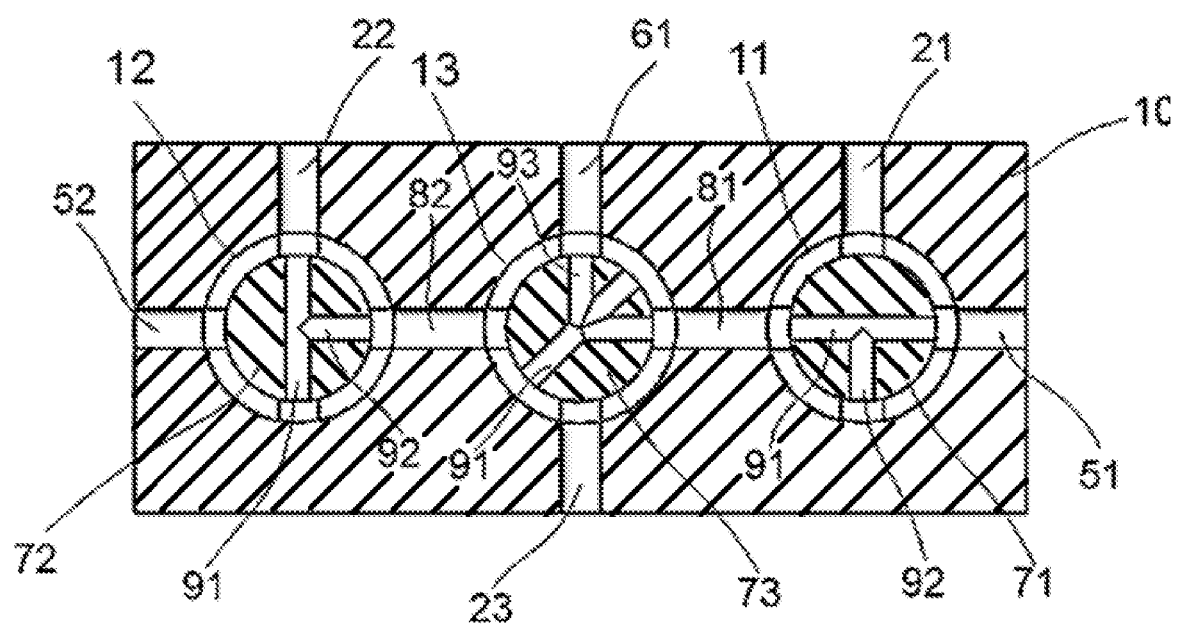
FIGS. 2a to 2c are schematic cross-sectional views of a stream switching valve in three successive positions.
Figure 2B:
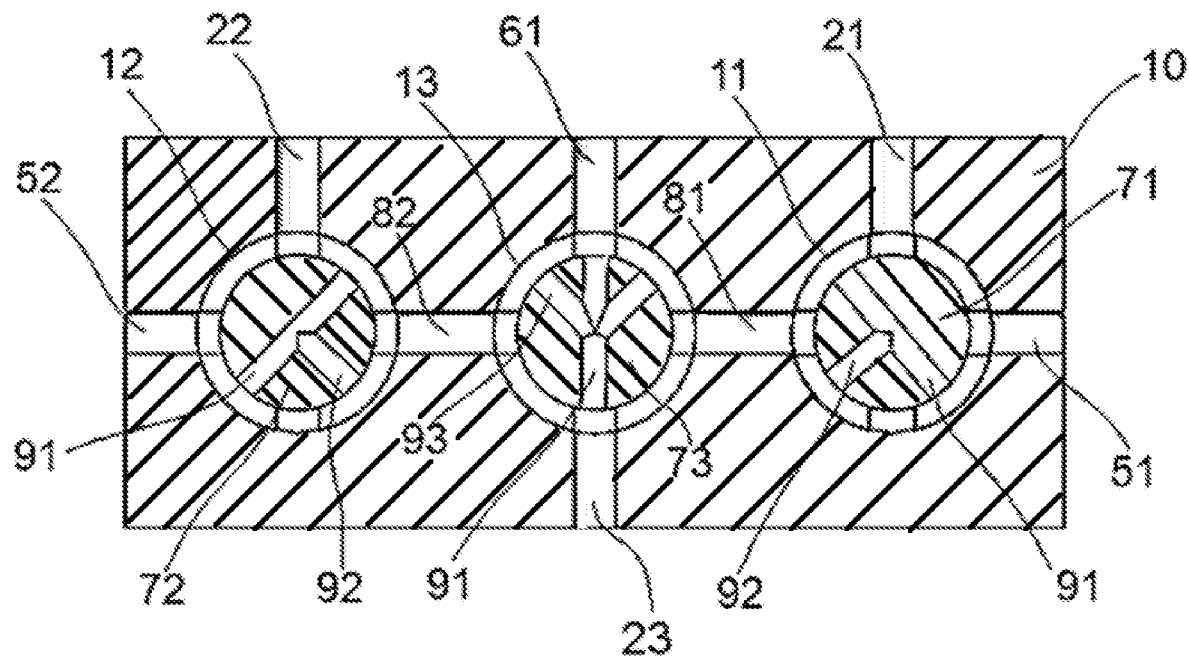
Figure 2C:
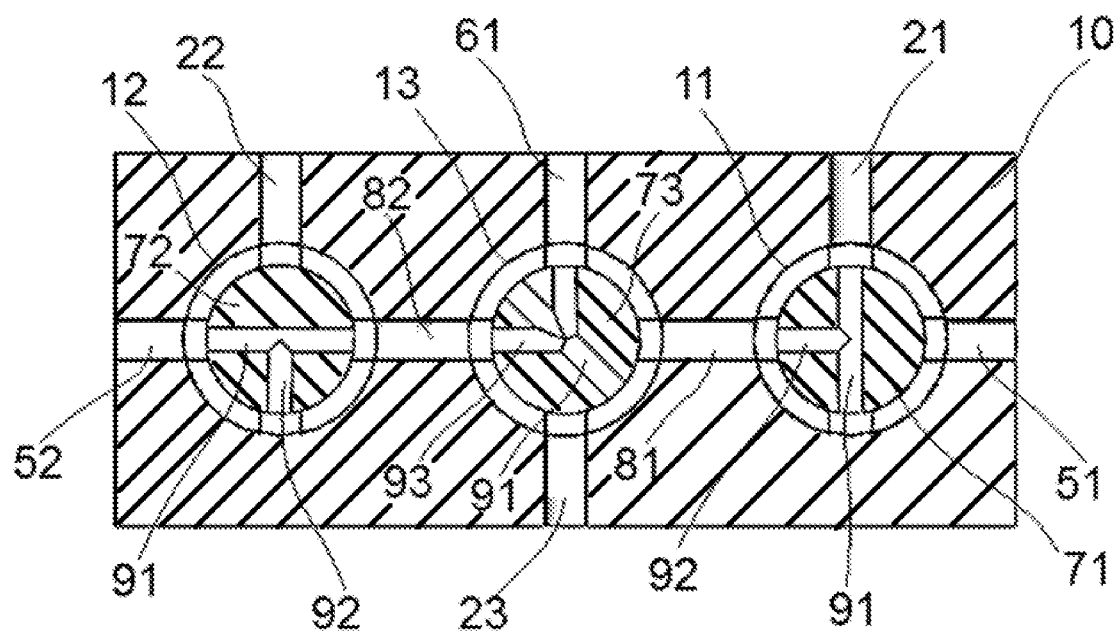

Reference is now made to FIGS. 2a to 2c explaining the operating principle of the present invention. The stream switching valve is mechanically preprogrammed for alternatively connecting two sources of fluids to an object of interest and emptying the internal passages after every fluid feed to the object of interest. Housing 10 has first, second and third cavities 11, 12 and 13 configured for receiving ball first, second and third members 71, 72 and 73. First inlet passage 51 being connectable to a first fluid source (not shown) is in fluid communication with first cavity 11. Second inlet passage 52 being connectable to a second fluid source (not shown) is in fluid communication with second cavity 12. First intermediate passage 81 fluidly interconnects first and third cavities 11 and 13, while second intermediate passage 82 fluidly interconnects second and third cavities 12 and 13. Outlet passage 61 being connectable to an object of interest (not shown) is in fluid communication with third cavity 13. Vent passages 21, 22 and 23 interconnect cavities 11, 12 and 13, respectively, with the environment. Needle valves, globe valves or any other sealing mechanisms used instead of ball valves are also in the scope of the present invention. According to one embodiment of the present invention, the object of interest is a gas analyzer.

Referring to FIG. 2a, the shown positions of first and third ball members 71 and 73 provide fluid communication between the first fluid source (not shown) connectable to first inlet passage 51 and the fluid object of interest (not shown) connectable to outlet passage 61. In fact, a fluid from the first fluid source is conducted through first inlet passage 51, diametrical passage 91 within first ball member 71, first intermediate passage 81, two radial passages orthogonal to each other 93 within third ball member 73 and outlet passage 61 to the fluid object of interest. Concurrently, second ball member 72 provides fluid communication between second intermediate passage 82 and second vent passage 22. Second intermediate passage 82 is emptied through fluidly interconnected radial and diametrical passages 91 and 92 of second ball member 82.

Referring to FIG. 2b, position of first and second ball members 71 and 72 block all adjacent passages, while third ball member 73 provides fluid connection between outlet passage 61 and third vent passage 23 via diametrical passage 91. Moreover, the fluid object of interest (not shown) is emptied to be ready to a next measurement.

Referring to FIG. 2c, the shown positions of ball members 72 and 73 provide fluid communication between the second fluid source (not shown) connectable to second inlet passage 52 and the fluid object of interest (not shown) connectable to outlet passage 61. In fact, a fluid from the second fluid source is conducted through second inlet passage 52, diametrical passage 91 within second ball member 72, first intermediate passage 81, two radial passages orthogonal to each other 93 within third ball member 73 and outlet passage 61 to the fluid object of interest. Concurrently, first ball member 71 provides fluid communication between first intermediate passage 81 and first vent passage 21. First intermediate passage 81 is emptied through fluidly interconnected radial and diametrical passages 91 and 92 of first ball member 71.

Between the positions of ball members 71, 72 and 73 shown in FIGS. 2a to 2c, there is no fluid communication between inlet passages 51 and 52, outlet passage 61 and vent passages 21, 22 and 23.

As mentioned above, first, second and third ball members 71, 72 and 73 are rotated by a single actuator and cogwheel mechanism (cogwheels 31-33) provides time synchronization between them.

It should be emphasized that the stream switching valve of the present invention constitutes a "no-dead-volume" technical solution because all passages of the valve are emptied after every feed of the fluid to the object of interest.

According to the present invention, a stream switching valve for alternatively feeding two fluids to an object of interest is disclosed. The aforesaid stream switching valve comprises: (a) a housing having first, second and third cavities; (b) first, second and third ball members sealably placeable into said first, second and third cavities, respectively, in a rotatable manner; said first, second and third ball members having said first, second and third stem members, respectively; (c) first and second inlet passages being in fluid communication with said first and second cavities, respectively; said first and second inlet passages connectable to first and second fluid sources, respectively; (d) an outlet passage being in fluid communication with said third cavity; said outlet passage connectable to a fluid object of interest; (e) first and second intermediate passages fluidly connecting said first and second cavities to said third cavity, respectively; (f) first, second and third vent passages fluidly connecting said into first, second and third cavities to environment.

It is a core feature of the invention to provide the first and second ball members are configured to connect said first and second intermediate passages to first and second inlet passages and first and second vent passages, respectively, in turn. The third ball member being rotatable is configured to connect said outlet passage to said first intermediate passage, said second intermediate passage and said third vent passage in turn.

According to one embodiment of the present invention, rotation of said first, second and third stem members is kinematically synchronized by first, second and third cogwheels pivoted to said first, second and third stem members, respectively, thereat said first and second cogwheels are coupled with said third cogwheel.

According to another embodiment of the present invention, said first, second and third cogwheels are configured for synchronized rotation of said first, second and third ball members; said first, second and third ball members have three successive positions: (a) said first ball member interconnects said first inlet passage and said first intermediate passage; said second ball member interconnects said second intermediate passage and said second vent passage; said third ball member interconnects said first intermediate passage and said outlet passage; (b) said third ball member interconnects said outlet passage and said third vent passage; and (c) said second ball member interconnects said second inlet passage and said second intermediate passage; said first ball member interconnects said first intermediate passage and said first vent passage; said third ball member interconnects said second intermediate passage and said outlet.

According to another embodiment of the present invention, the first, second and third cogwheels are rotatable by one actuator.

According to another embodiment of the present invention, the actuator is selected from the group consisting of an electric actuator, a pneumatic actuator, a manual actuator, a magnetic actuator and any combination thereof.

According to a further embodiment of the present invention, said housing has a longitudinal axis and said first, third and second cavities are successively distributed along said axis.

According to a further embodiment of the present invention, said first and second inlet passages are parallel to said axis; said outlet passage, first, second and third vent passages are perpendicular to said axis.

According to a further embodiment of the present invention, each of said first and second ball members has a diametrical passage and a radial passage fluidly connected to said diametrical passage.

According to a further embodiment of the present invention, said third ball member have a diametrical passage and two radial passages orthogonal to each other and symmetrically oriented relative to said diametrical passage.

According to a further embodiment of the present invention, at least one of said two fluids is selected from the group consisting of a fluid to be analyzed and a calibration fluid.

According to a further embodiment of the present invention, a method of alternatively feeding two fluids to an object of interest is disclosed. The aforesaid method comprises the steps of: (a) providing a stream switching valve comprising: (i) a housing having first, second and third cavities; (ii) first, second and third ball members sealably placeable into said first, second and third cavities, respectively, in a rotatable manner; said first, second and third ball members having said first, second and third stem members, respectively; (iii) first and second inlet passages being in fluid communication with said first and second cavities, respectively; said first and second inlet passages connectable to first and second fluid sources, respectively; (iv) an outlet passage being in fluid communication with said third cavity; said outlet passage connectable to a fluid object of interest; (v) first and second intermediate passages fluidly connecting said first and second cavities to said third cavity, respectively; (vi) first, second and third vent passages fluidly connecting said into first, second and third cavities to environment; (vii) said first and second ball members are configured to connect said first and second intermediate passages to first and second inlet passages and first and second vent passages, respectively, in turn; (viii) said third ball member being rotatable is configured to connect said outlet passage to said first intermediate passage, said second intermediate passage and said third vent passage in turn; (b) providing first and second fluids from said first and second sources to said first and second inlets, respectively; (c) providing a first fluid to said outlet passage and emptying said second intermediate passage by positioning said first ball member for interconnecting said first inlet passage and said first intermediate passage, said second ball member for interconnecting said second intermediate passage and said second vent passage and said third ball member for interconnecting said first intermediate passage and said outlet passage; (d) emptying said outlet passage by positioning said third ball member for interconnecting said outlet passage and said third vent passage; and (e) providing a second fluid to said outlet passage and emptying said first intermediate passage by positioning said second ball member for interconnecting said second inlet passage and said second intermediate passage, said first ball member for interconnecting said first intermediate passage and said first vent passage and said third ball member for interconnecting said second intermediate passage and said outlet.

According to a further embodiment of the present invention, said steps c, d and e of successively positioning said first, second and third stem members are kinematically synchronized by first, second and third cogwheels pivoted to said first, second and third stem members, respectively, thereat said first and second cogwheels are coupled with said third cogwheel.

The invention claimed is:

1. A stream switching valve for alternatively feeding two fluids to an object of interest; said stream switching valve comprising:
   i. a housing having first, second and third cavities;
   ii. first, second and third ball members sealably placeable into said first, second and third cavities, respectively, in a rotatable manner; said first, second and third ball members having said first, second and third stem members, respectively;
   iii. first and second inlet passages being in fluid communication with said first and second cavities, respectively; said first and second inlet passages connectable to first and second fluid sources, respectively;
   iv. an outlet passage being in fluid communication with said third cavity; said outlet passage connectable to a fluid object of interest;
   v. first and second intermediate passages fluidly connecting said first and second cavities to said third cavity, respectively;
   vi. first, second and third vent passages fluidly connecting said into first, second and third cavities to environment; wherein said first, second and third stem members are kinematically synchronized by first, second and third cogwheels pivoted to said first, second and third stem members, respectively; said first and second cogwheels are coupled with said third cogwheel such that said first and second ball members are configured to connect said first and second intermediate passages to first and second inlet passages and first and second vent passages, respectively, in turn; said third ball member being rotatable is configured to connect said outlet passage to said first intermediate passage, said second intermediate passage and said third vent passage in turn; said first, second and third ball members have three successive positions:
   a. said first ball member interconnects said first inlet passage and said first intermediate passage; said second ball member interconnects said second intermediate passage and said second vent passage; said third ball member interconnects said first intermediate passage and said outlet passage;
   b. said third ball member interconnects said outlet passage and said third vent passage;
   c. said second ball member interconnects said second inlet passage and said second intermediate passage; said first ball member interconnects said first intermediate passage and said first vent passage; and
   d. said third ball member interconnects said second intermediate passage and said outlet.

2. The stream switching valve according to claim 1, wherein said housing has a longitudinal axis and said first, third and second cavities are successively distributed along said axis.

3. The stream switching valve according to claim 2, wherein said first and second inlet passages are parallel to said axis; said outlet passage, first, second and third vent passages are perpendicular to said axis.

4. The stream switching valve according to claim 3, wherein each of said first and second ball members has a diametrical passage and a radial passage fluidly connected to said diametrical passage.

5. The stream switching valve according to claim 3, wherein said third ball member has a diametrical passage and two radial passages orthogonal to each other and symmetrically oriented relative to said diametrical passage.

6. The stream switching valve according to claim 3, wherein at least one of said two fluids is selected from the group consisting of a fluid to be analyzed and a calibration fluid.

7. A method of alternatively feeding two fluids to an object of interest; said method comprising the steps of:
   a. providing a stream switching valve comprising:
      i. a housing having first, second and third cavities;
      ii. first, second and third ball members sealably placeable into said first, second and third cavities, respectively, in a rotatable manner; said first, second and third ball members having said first, second and third stem members, respectively;
      iii. first and second inlet passages being in fluid communication with said first and second cavities, respectively; said first and second inlet passages connectable to first and second fluid sources, respectively;
      iv. an outlet passage being in fluid communication with said third cavity; said outlet passage connectable to a fluid object of interest;
      v. first and second intermediate passages fluidly connecting said first and second cavities to said third cavity, respectively;
      vi. first, second and third vent passages fluidly connecting said into first, second and third cavities to environment;
      said first and second ball members are configured to connect said first and second intermediate passages to first and second inlet passages and first and second vent passages, respectively, in turn; said third ball member being rotatable is configured to connect said outlet passage to said first intermediate passage, said second intermediate passage and said third vent passage in turn;

b. providing first and second fluids from said first and second sources to said first and second inlets, respectively;
c. providing a first fluid to said outlet passage and emptying said second intermediate passage by positioning said first ball member for interconnecting said first inlet passage and said first intermediate passage, said second ball member for interconnecting said second intermediate passage and said second vent passage and said third ball member for interconnecting said first intermediate passage and said outlet passage;
d. emptying said outlet passage by positioning said third ball member for interconnecting said outlet passage and said third vent passage; and
e. providing a second fluid to said outlet passage and emptying said first intermediate passage by positioning said second ball member for interconnecting said second inlet passage and said second intermediate passage, said first ball member for interconnecting said first intermediate passage and said first vent passage and said third ball member for interconnecting said second intermediate passage and said outlet; said steps c, d and e of successively positioning said first, second and third stem members are kinematically synchronized by first, second and third cogwheels pivoted to said first, second and third stem members, respectively said first and second cogwheels are coupled with said third cogwheel.

8. The method according to claim 7, wherein said housing is provided with a longitudinal axis and said first, third and second cavities are successively distributed along said axis.

9. The method according to claim 8, wherein said first and second inlet passages are parallel to said axis; said outlet passage, first, second and third vent passages are perpendicular to said axis.

10. The method according to claim 9, wherein each of said first and second ball members has a diametrical passage and a radial passage fluidly connected to said diametrical passage.

11. The method according to claim 9, wherein said third ball member has a diametrical passage and two radial passages orthogonal to each other and symmetrically oriented relative to said diametrical passage.

12. The method according to claim 9, wherein at least one of said two fluids is selected from the group consisting of a fluid to be analyzed and a calibration fluid.

* * * * *